May 11, 1937.  H. G. DAVIS  2,079,603
COFFEE MAKER
Filed July 9, 1935  2 Sheets-Sheet 1
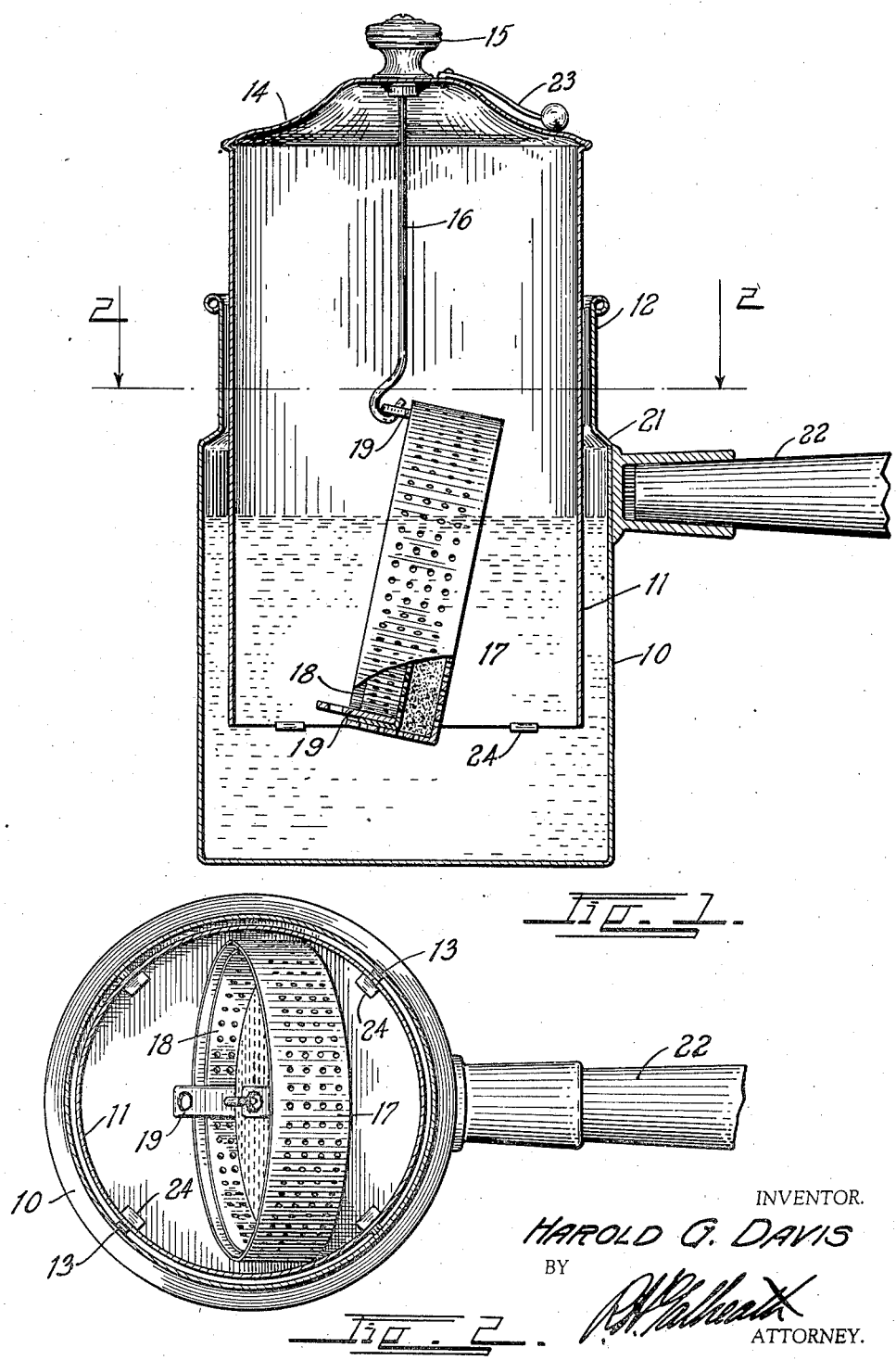
INVENTOR.
HAROLD G. DAVIS
BY
ATTORNEY.

May 11, 1937.  H. G. DAVIS  2,079,603
COFFEE MAKER
Filed July 9, 1935   2 Sheets-Sheet 2
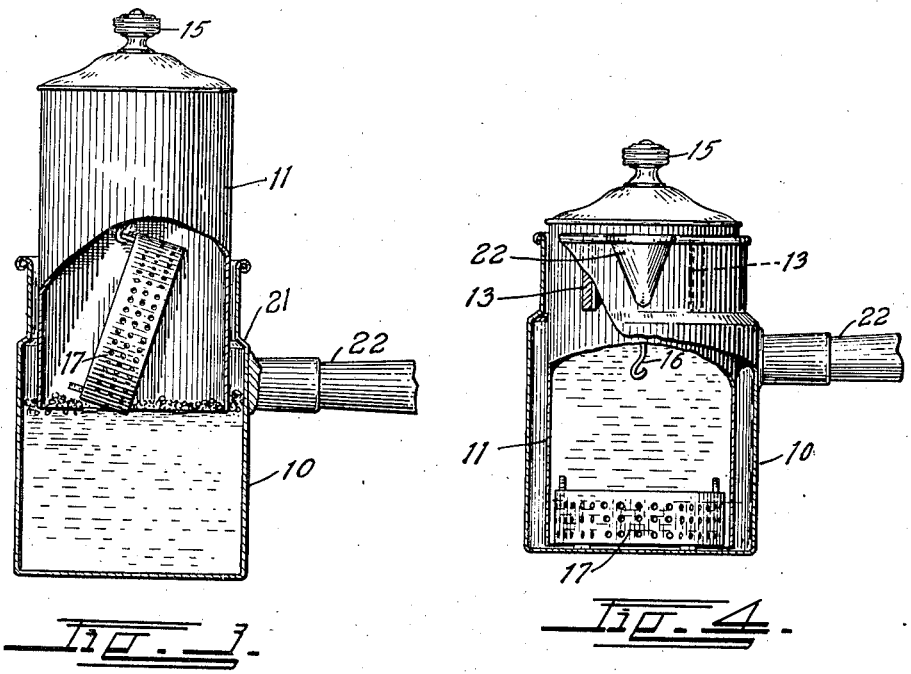
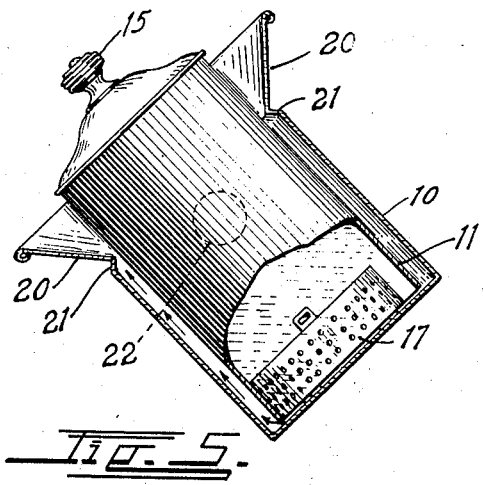
INVENTOR.
HAROLD G. DAVIS
BY
ATTORNEY.

Patented May 11, 1937

2,079,603

UNITED STATES PATENT OFFICE 2,079,603

COFFEE MAKER

Harold G. Davis, Denver, Colo.

Application July 9, 1935, Serial No. 30,458

8 Claims. (Cl. 53—3)

This invention relates to a device for making coffee and has for its principal object the provision of a neat, simple and highly efficient device which will automatically place the ground coffee in the water after the latter has been brought to the boiling point and removed from the fire; which will positively prevent boiling of the coffee grounds in the water; which will prevent the escape of all vapors and volatile constituents of the coffee; and which will be easy to use and easily kept clean and sanitary.

Other objects of the invention are to provide a coffee maker which cannot be easily boiled over; which will retain the heat in the coffee for extremely long periods; which will prevent the coffee grounds from entering the cup; and which will give an audible signal to the user when the water therein has reached the boiling point.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:—

Fig. 1 is a vertical cross section through the improved coffee maker, illustrating it in an intermediate position after it has been removed from the flame.

Fig. 2 is a horizontal cross section therethrough taken on the line 2—2, Fig. 1.

Figs. 3 and 4 and 5 are diagrammatic cross sections illustrating the device in the "boiling", "steeping" and "pouring" positions, respectively.

The invention comprises an outer container 10 having an open top for the reception of an open bottomed inner container 11. The open top of the outer container is reduced in size as shown at 12 so as to form an inwardly extending shoulder 21 and so as to fit comparatively close to the inner container 11. The two containers are maintained spaced from each other at the reduced top by vertical guide projections 13 secured to the inner wall of the outer container 10 about the open top thereof to provide slides for the inner container.

The inner container is provided with a closed top 14 having a finger knob 15 on the exterior and a relatively long hook 16 depending from the interior.

The ground coffee is carried in a perforated or mesh outer basket 17 in which a flanged disc 18 is snuggly received. The disc 18 is also of perforated or open mesh wire material and is provided with two rings or handles 19 by means of which it may be pulled from the basket 17 when desired.

Two opposed pouring spouts 20 are extruded from the upper rim of the outer container 10. The spouts 20 lead from the container above the inwardly extending shoulder 21 formed by the narrowed neck of the container. Any suitable handle may be provided for the outer container. It is preferred to employ a straight handle 22 extending at right angles to the line of the spouts 20, so that it may be employed as a ladle.

If desired a striker member 23 may be secured to the top 14 so that vibration of the inner container by water boiling in the outer container will cause the striker to vibrate against the top 14 to given an audible signal that the boiling point has been reached. The bottom edge of the inner container is formed with a series of thin, inwardly-turned lugs 24.

Operation

The desired amount of water is placed in the outer container. The desired amount of ground coffee is placed in the basket 17 and the inner flanged disc 18 is pressed down against the coffee. It is preferred to tap the basket on the table top to settle and spread the coffee therein over the entire bottom of the basket. This also serves to shake loose any free coffee dust from the coffee.

The basket is then hung by means of one of the rings 19 from the hook 16, as shown in Fig. 3, and the inner container is set into the outer container. The air entrapped in the top of the inner container allows it to sink but a short distance into the water. As the water becomes heated the air in the upper container will expand to create a pressure which will force the air from the inner container beneath the lower edge thereof from whence it will bubble to the surface in the outer container and escape. This constant evacuation of air creates a rarified condition or partial vacuum within the inner container.

When the boiling point is reached the inner container will be filled with expanded steam and will float upon the bubbling surface of the water. This imparts a dancing or bouncing movement to the inner container which actuates the striker 23 to give an audible alarm that the water is boiling.

It is desired to call attention to the fact that during the boiling period the coffee grounds are suspended above the water surface, as shown in Fig. 3, so that they are not subjected to the boiling action to remove the heavy tar-like substances which injure the flavor of the coffee. The coffee is only subjected to a steaming action which expands and opens its porous structure for the release of the flavor.

The user now lifts the coffee maker from the fire and places it upon the table or other supporting surface. The water soon ceases to steam and the expanded air and vapor in the inner container begins to contract. This allows the upper container to gradually descend into the water, as shown in Fig. 1. It is desired to call attention to the fact that the coffee grounds enter the water while the latter is at boiling temperature but yet the grounds are never subjected to boiling.

It will be noted that the coffee basket protrudes slightly below the inner container so that when the latter reaches the bottom of the outer container, the basket will strike the bottom. The hook 16 will then descend somewhat lower so as to release the ring 19 and allow the basket to fall flat in the bottom of the inner container where it will be supported upon the lugs 24.

The partial vacuum forming in the inner container by the contraction of the air and vapors therein, now draws the remaining water from the outer container upwardly through the coffee grounds into the inner container as shown in Fig. 4. After the outer container has been emptied of water, air will be drawn downwardly through the outer container beneath the rim of the inner container and will bubble upwardly through the coffee therein, creating a circulation or agitation in the latter which will assist in the absorbing or steeping action.

When the coffee has steeped the desired interval, depending upon the strength desired, it is poured from one of the spouts 20 into the cup, as shown in Fig. 5. To reach the spout the coffee must flow downwardly through the coffee basket thence upwardly along the wall of the outer container and over the shoulder 21 to the spout. This allows ample opportunity for any suspended grounds to settle from the coffee; first, in the bottom of the outer container; second, along the wall of the outer container; and third, behind the shoulder 21; so that the discharging coffee is clear of suspended material.

It is desired to call attention to the fact that while the coffee is steeping, see Fig. 4, it is entirely surrounded by an envelope of air. The outer container is empty and forms an air jacket around the inner container. The partial vacuum in the top of the inner container also forms a perfect heat insulation for the top. The only possible place for heat to escape is at the bottom and this is protected by the pad of coffee grounds in the basket 17. Therefore, the coffee will remain hot for hours after being taken from the fire.

Let us assume that it is desired to reheat the coffee. It is still impossible to boil the grounds for as soon as the water begins to heat, the vapor in the upper part of the inner container expands and lifts the latter to the solution level by means of the lugs 24 so that the coffee grounds are again lifted from the water.

While the coffee is being poured from one of the spouts, air gradually enters at the opposite side of the inner container to release the coffee therefrom. As soon as the coffee maker is again turned upright, the coffee will be again drawn from the outer container by the cooling and contracting air and vapors in the inner container. During the boiling and steeping periods the top of the coffee fluid is completely covered so that no coffee fumes or aromatic vapors can escape. All are retained to enhance the flavor of the brewed coffee. The device is completely automatic and passes through its cycles of operation without, and regardless of manual interference.

It is desired to call attention to the purposes and advantages of the hook member 16. The coffee basket could be placed across the bottom of the inner container, as shown in Fig. 4, at the start of operations. But it was found that this so covers the water surface that vapors and steam can only escape around the edges of the basket. This tends to produce a very slow, sluggish operation. Much time is required for the inner container to first rise from and then settle back into the water. The flat basket bottom slaps the water surface or causes splashing and boiling over during the boiling period. With the basket suspended on the hook member 16, however, the entire water surface is open for the release of heat, vapours and steam giving a rapid action of the various cycles. Only the sharp edge of the inner container rests on and vibrates on the water surface so that there is no splashing or "boiling over".

While the device has been described as a coffee-maker it is of course equally applicable for the brewing of tea or other beverages.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A coffee maker comprising: an open topped outer container; an open bottomed inner container telescoping into said outer container and being free to vertically reciprocate therein; a hook member in said inner container; and a porous basket for containing ground coffee supported from said hook member, said basket normally depending below said inner container so that it will contact with the bottom of said outer container to release itself from said hook member as the inner container approaches its lowermost position in said outer container.

2. A coffee maker comprising: an open topped outer container; an open bottomed inner container vertically reciprocating in said outer container; a hook member in said inner container; a porous basket for containing ground coffee supported from said hook member, said basket normally depending below said inner container so that it will contact with the bottom of said outer container when the inner container approaches its lowermost position therein to release itself from said hook member; and means on said inner container for receiving said basket when the latter is unhooked.

3. A coffee maker comprising: an open topped outer container; an open bottomed inner container free to slide telescopically within the open top of said outer container both containers being hermetically sealed except for their respective open top and bottom; a porous container for coffee grounds; means for supporting said porous container above the open bottom of said inner container; and means for releasing said supporting means so as to allow said porous container to assume a position across the open bottom of said inner container when the latter approaches its lowermost position in said outer container.

4. A coffee maker comprising: an open topped outer container; an open bottomed inner container free to slide telescopically within the open top of said outer container both containers being hermetically sealed except for their respective open top and bottom; a porous container for coffee grounds; means for supporting said porous container above the open bottom of said inner container; means for releasing said supporting means so as to allow said porous container to assume a position across the open bottom of said inner container when the latter approaches its lowermost position in said outer container; and means engageable by said porous container for supporting it across the open bottom of said inner container.

5. A coffee maker comprising: an open topped outer container; an open bottomed inner container free to slide telescopically within the open top of said outer container; a porous container for coffee grounds; means for supporting said porous container above the open bottom of said inner container; and means for releasing said supporting means so as to allow said porous container to assume a position across the open bottom of said inner container when the latter approaches its lowermost position in said outer container.

6. A coffee maker comprising: an open topped outer container; an open bottomed inner container arranged to vertically reciprocate in said outer container; means in said inner container for supporting coffee grounds therein above said open bottom while said inner container is under pressure; and means for releasing said supporting means while said inner container is under a partial vacuum.

7. In a coffee maker, an open topped outer container; an open bottomed inner container vertically movable in said outer container and adapted to float upon water therein, said containers being hermetically sealed except for said open top and bottom ring so that entrapped air in said inner container will support the latter above the surface of the water until a reduction of pressure occurs in said inner container to draw the water from said outer container into said inner container to start the brewing action.

8. A method of brewing coffee comprising: evacuating the air from an enclosure about said coffee to form a partial vacuum; thence allowing the partial vacuum formed by said evacuating to draw hot water into contact with said coffee; thence allowing air to be drawn by the remainder of said vacuum through said water and coffee so as to create an agitation during the brewing period.

HAROLD G. DAVIS.